United States Patent [19]

Kotani et al.

[11] Patent Number: 5,045,953
[45] Date of Patent: Sep. 3, 1991

[54] IMAGE DATA TRANSMISSION APPARATUS WITH DETACHABLE READER

[75] Inventors: Matahira Kotani, Ikoma; Masayuki Hachinoda, Nara; Motohiko Hayashi, Yamatokoriyama; Naomitsu Murata, Nagoya; Mitsunobu Kondo, Yokohama, all of Japan

[73] Assignees: Sharp Kabushi Kaisha, Osaka; Nippon Telegraph and Telephone Corporation, Tokyo, both of Japan

[21] Appl. No.: 323,856

[22] Filed: Mar. 15, 1989

[30] Foreign Application Priority Data

Mar. 15, 1988 [JP] Japan .................... 63-62665

[51] Int. Cl.5 .......................................... H04N 1/024
[52] U.S. Cl. .................................... 358/473; 358/431
[58] Field of Search ............. 358/400, 401, 404, 426, 358/430, 431, 471, 473, 474; 382/59

[56] References Cited

U.S. PATENT DOCUMENTS

| | | | |
|---|---|---|---|
| 4,386,373 | 5/1983 | Kondo et al. | 358/431 |
| 4,586,088 | 4/1986 | Kondo | 358/431 |
| 4,626,925 | 12/1986 | Toyoda | 358/473 |
| 4,652,937 | 3/1987 | Shimura et al. | 358/473 |
| 4,962,526 | 10/1990 | Kotami et al. | 350/473 |

FOREIGN PATENT DOCUMENTS

| | | | |
|---|---|---|---|
| 59-201578 | 11/1984 | Japan | 358/431 |
| 60-112373 | 6/1985 | Japan | 358/431 |
| 62-30461 | 2/1987 | Japan | . |

Primary Examiner—Edward L. Coles, Sr.

[57] ABSTRACT

A group III facsimile apparatus is provided with a detachable image reading unit for hand held scanning of large or bulky originals. Lines of image data from the image reading unit are stored in a memory, and then read out and converted to modified Huffman (MH) running length code for transmission. Fill bits are added where necessary so that each line has a minimum transmission time of 10 milliseconds. A group III facsimile apparatus normally automatically disconnects from a transmission when no data has been transmitted for five seconds. To keep this from happening while an original is being scanned slowly by hand, enough fill bits are added to make each line a minimum transmission time of one second when the number of lines of image data in the memory is less than 10.

6 Claims, 4 Drawing Sheets

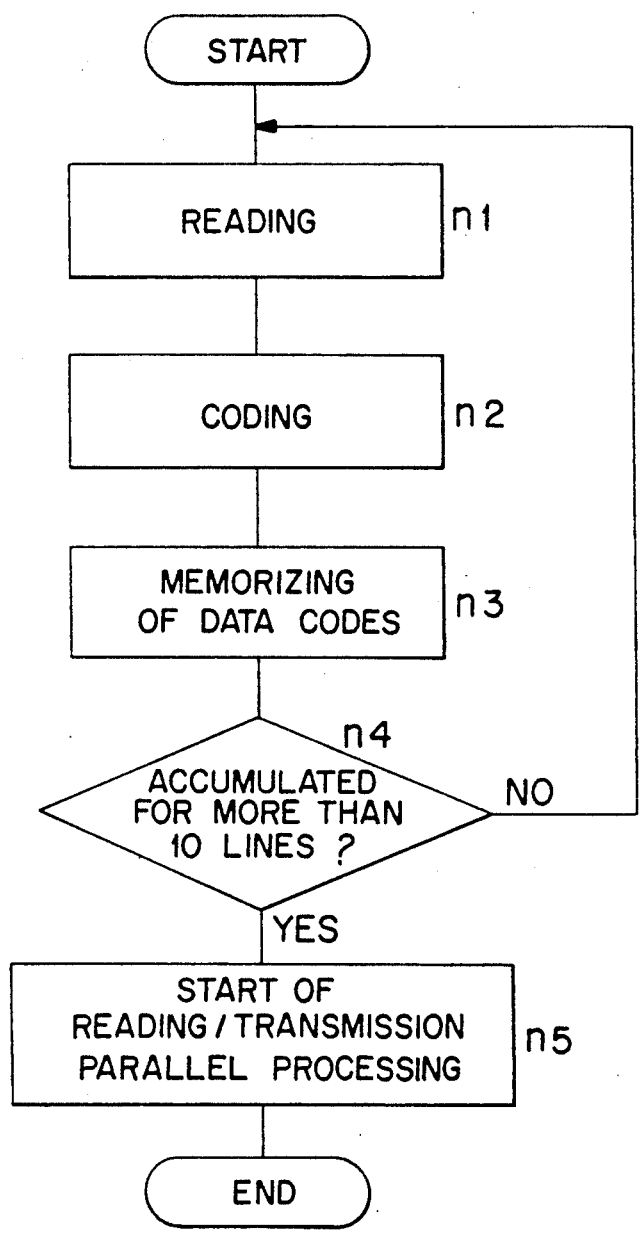

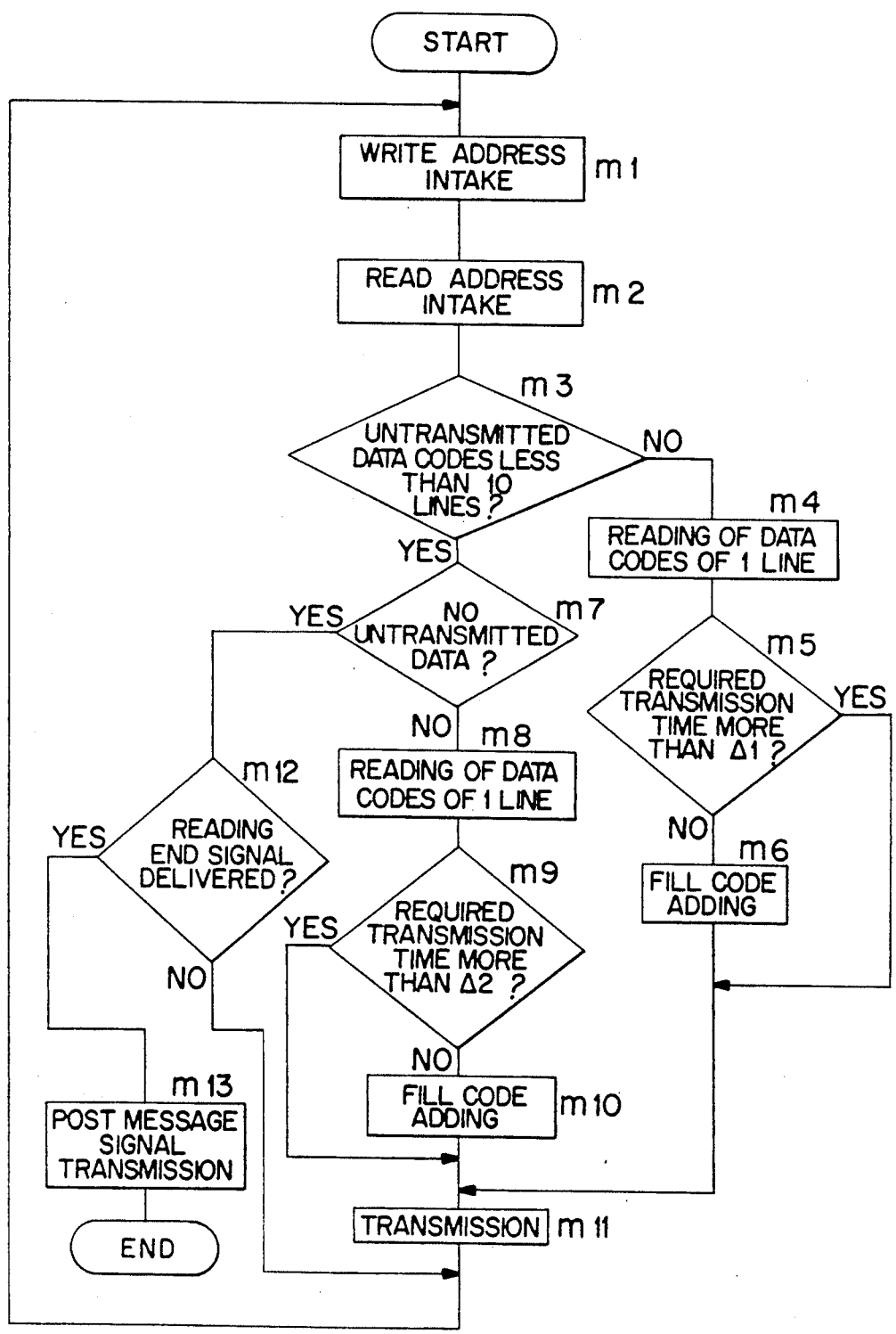

IMAGE DATA TRANSMISSION APPARATUS WITH DETACHABLE READER

BACKGROUND OF THE INVENTION

1. Field of the Invention

The present invention relates to an image data transmission apparatus preferably, preferably used in facsimile apparatus or the like.

2. Description of the Prior Art

In a facsimile apparatus, the original image is read by a one-dimensional contact type image sensor (hereinafter called image sensor) including, for example, a charge coupled device (CCD). In the vicinity of the image sensor of the main body of the facsimile apparatus, an original inlet stretching along the image sensor is formed, and by inserting the originals, the image of which is to be transmitted, into this original inlet, the inserted original is transferred in the direction orthogonal to the longitudinal direction of the image sensor and the original image is read out by the image sensor at the same time.

In such facsimile apparatus, a large original or a bulky original such as a book cannot be inserted into the original inlet, so its image can be neither read nor transmitted. It has been considered to mount a reading unit including the image sensor detached from the main body of the facsimile apparatus so as to read the image of the original, that cannot be inserted from the original inlet, by scanning manually.

In such a case, however, since the original plane is scanned manually, the scanning speed is not always constant. Therefore, when the original plane is scanned at an excessively high speed by the reading unit, the image data transmission processing by the facsimile apparatus cannot catch up with the reading processing by the reading unit, and a reading error may occur. It is therefore necessary to scan the original plane by the reading unit at a considerably low speed. If the speed is extremely low, the image data transmission processing by the facsimile apparatus goes ahead of the reading processing by the reading unit. As a result, in the facsimile apparatus conforming to the standard of Group 3 for document transmission, when there is no longer image data to be transmitted, and when a data blank period lasts for more than 5 second, the transmission is cut off from the telephone line, and the subsequent image data cannot be transmitted.

When transmitting the image data which is by manual scanning of the reading unit on the original plane, it is necessary to first store the read image data in memory, then connect the line with the facsimile apparatus of the destination side, and transmit the image data out from the memory.

However, in order to store all image data to be transmitted first in the memory, a large memory capacity is required, and realtime transmission processing can not be realized, so it takes a relatively long time for image data transmission. Furthermore, the operator must manipulate the operation unit of the facsimile apparatus to specify the reading processing of the image data into the memory, and the controllability of such a facsimile apparatus is extremely poor.

SUMMARY OF THE INVENTION

It is a primary object of the invention to present an image data transmission apparatus capable of high speed transmission of the image data being read by manually operating an image reading unit, which is detachably mounted on the image data transmission apparatus main body, on the original.

In order to achieve the above object, the invention presents an image data transmission apparatus a unit quantity of image data is encoded in variable length and transmitted into a transmission like. When the encoded unit quantity of the image data is less than a predetermined value, false data is added to the encoded unit quantity of the image data so that the transmission time of the unit quantity of the image data may be a first minimum time, and when no image data has been transmitted for a predetermined period on the condition of the transmission line, being connected, then the transmission line is off. The apparatus includes, a transmission apparatus main body, and an image reading unit detachably mounted on the transmission apparatus main body.

The transmission apparatus main body includes:

a memory for storing the read image data in each unit quantity, and means for transmitting the image data in the unit quantity, and when the image data quantity to be transmitted stored in the memory is less than a predetermined data quantity, false data is added to the unit quantity so that the transmission time of the unit quantity may be a second minimum time exceeding the first minimum time.

According to a preferred embodiment of the invention, the image reading unit includes:

optical reading means, a rotary roller rotating contacting with the surface of an original from which the image is to be read, and angular disposition detecting means emitting a signal at every predetermined angular disposition of the rotary roller, for detecting a relative moving state between the image reading unit and the original, The transmission apparatus main body includes:

control means for storing image data from an optical reading means into the memory in synchronism with the output of the angular disposition detecting means, and sending out the stored data of this memory as the image data. The image data being read by scanning the image reading unit by hand first is stored in the memory, and is read out of this memory to be transmitted into the transmission line. The scanning speed of this manual operation is not always constant, and the transmission processing of the image data may be done at higher speed than the reading processing of the image data. As a result, when the memory becomes empty of the data to be transmitted, and the transmission of image data is stopped for a predetermined period, the transmission line is shut off. In the invention, however, when the quantity of the untransmitted image data stored in the memory decreases and becomes less than a predetermined data quantity, a second minimum time is set, and the transmission process of unit quantity of the image data takes more than the second minimum time exceeding the first minimum time. As a result, if the manual operation of the image reading unit on the original plane is carried out at an extremely low speed, the communication line is not cut off, and the image data can be transmitted continuously.

Therefore, the image data read by above mentioned way is transmitted, so to speak, in real time, so that the image data may be transmitted at high speed.

In another preferred embodiment of the invention, the optical reading means includes a one-dimensional contact type image sensor, and the image data in the unit quantity is the image data on one scanning line which is read out by the one-dimensional contact type image sensor.

BRIEF DESCRIPTION OF THE DRAWINGS

These and other objects of the invention, as well as the features and advantages thereof, will be better understood and appreciated from the following detailed description taken in conjunction with the drawings, in which:

FIG. 4 and FIG. 5 are flowcharts explaining the procedure of the image data transmission in the facsimile apparatus 1.

DETAILED DESCRIPTION OF THE PREFERRED EMBODIMENTS

Figure 1:
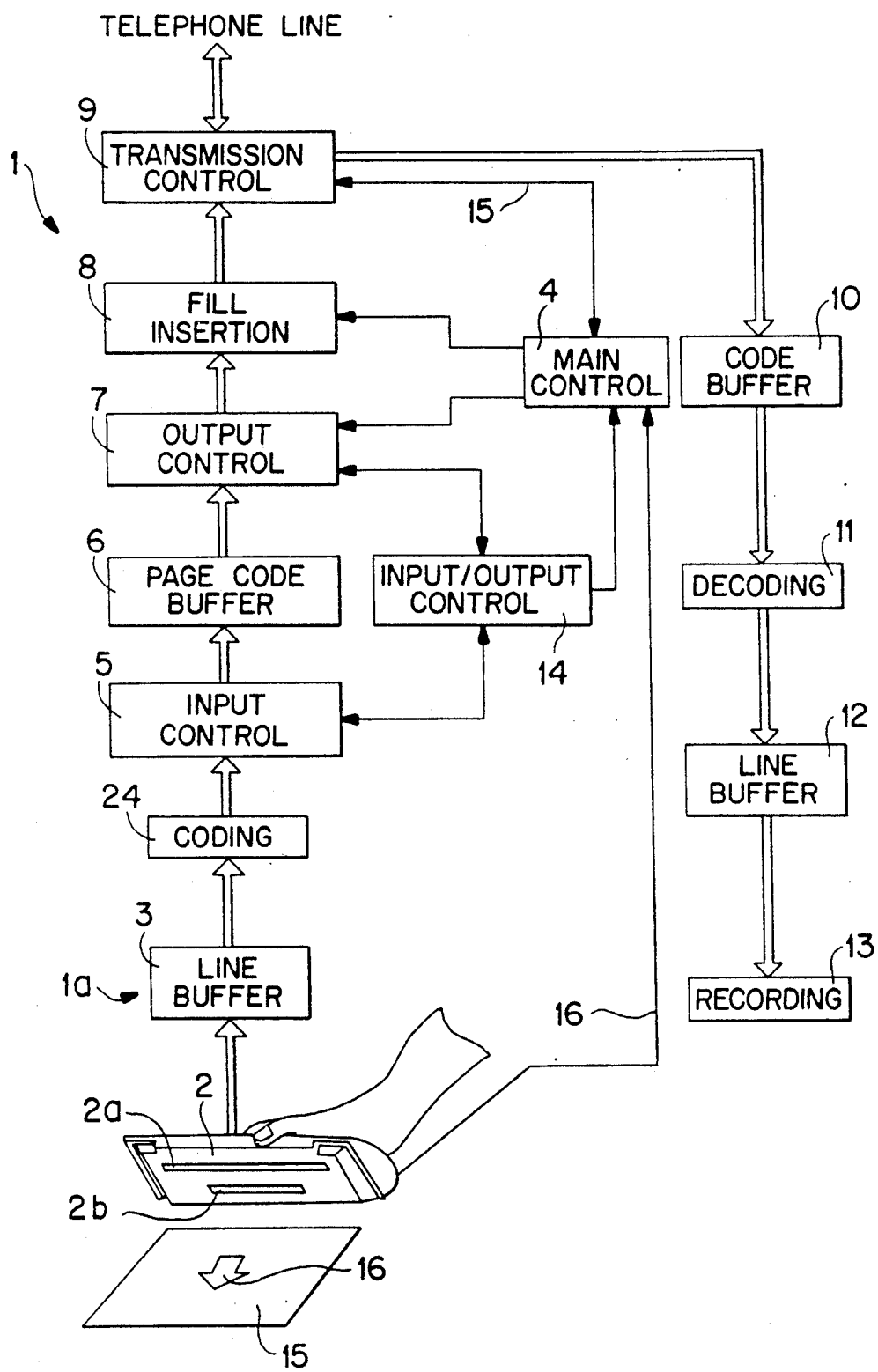
FIG. 1 is a block diagram showing an electric composition of a facsimile apparatus 1 according to one of the embodiments of the invention.

Referring now to the drawings, one of the preferred embodiments of the invention is described in below in detail.

EXAMPLE

FIG. 1 is a block diagram showing an electric composition of a facsimile apparatus 1 according to an embodiment of the invention. On the main body 1a of the facsimile apparatus 1 is detachably mounted a reading unit 2 comprising reading means 2a such as one-dimensional contact type image sensor containing, for example, a charge coupled device (CCD). While the reading unit 2 is mounted in the main body 1a, the original is transferred to the vicinity of the reading means 2a of the reading unit 2 by the function of an original conveying roller (not shown) installed in the main body 1a, and the original image is read. When the reading unit 2 is detached from the main body 1a, the original surface 15 may be manually scanned by the reading unit 2 in the direction of arrow 16 so that the reading means 2a can read the original image. In order to realize the function as such handy scanner, the reading unit 2 is provided with a rotary roller 2b for detection of the reading position, and also relating to the rotary roller 2b a rotary encoder (not shown), which is angular displacement detecting means, is disposed. The information relating to the reading position generated from the rotary encoder in the reading unit 2 is given through a line 16 to a main control unit 4 in the main body 1a.

The following explanation refers to the operation in the case of the reading unit 2 is detached from the main body 1a and is used as handy scanner.

The image data obtained by the reading processing of the reading unit 2 is applied to a line buffer 3 for storing the image data corresponding to one scanning line (hereinafter called line). The image data stored in the line buffer 3 is applied to a coding unit 24 to be converted into MH (modified Huffman) run length code, and the coded image data from the input control unit 5 is stored in a page code buffer 6 capable of holding one-page portion as data codes. The input control unit 5 excutes addressing the areas of the page code buffer 6, and write the data codes given from the coding unit 24 into the areas.

An output control unit 7 excutes addressing the areas, in which the data codes to be read out is stored, and the data codes stored in the area is read out by the output control unit. The data codes read out by the output control unit 7 is given to a fill insertion unit 8.

The facsimile apparatus conforming to the standard of Group 3 for document transmission is designed to transmit the image information according to the control procedure and transmission method specified in Recommendation T.30, T.4 of CCITT (Consultative Committee in International Telephone and Telegraph). In Recommendation T.4 of CCITT, the minimum time Δ1 required for transmission of codes corresponding to image information of one line is specified. The minimum transmission time Δ1 is specified, for example, at 10 msec, and when the actual transmission time of the data codes corresponding to the image information of one line is less than the minimum transmission time Δ1, fill codes indifferent to the image are added, so as to take more than the minimum transmission time Δ1 for transmission of codes corresponding to the image of one line.

In the fill insertion unit 8, the data codes delivered from the output control unit 7 is provided with such fill codes. In this embodiment, as mentioned below, due to the insertion of the fill codes, the required time for transmission of codes corresponding to the image of one line may be set more than a second minimum time, or a minimum transmission time Δ2. This minimum transmission time Δ2 is set at, for example, 1 sec.

The transmission codes provided with fill codes in the fill insertion unit 8 is sent into a transmission control unit 9. The transmission control unit 9 comprises a network control unit for controlling the line in relation to the external telephone line, and a modem for modulation/demodulation of the transmission signal being transmitted/received by the facsimile apparatus 1 through the telephone line. And the transmission control unit 9 is responsible for controlling the data transmission with the facsimile apparatus at the destination of communication.

The transmission codes such as data codes transmitted from the facsimile apparatus of the destination is temporarily held in a code buffer 10, and is given to the decoding unit 11. In the decoding unit 11, the image data is produced from the data codes, and this image data is given to a line buffer 12 which holds the image data for the portion of one line. The image data delivered from the line buffer 12 is applied to a recording unit 13 includes, for example, the thermal head, and for recording the image on a thermal recording paper or the like.

The number of lines between the line corresponding to the data code, which is applied to the page code buffer 6 from the input control unit 5, and the line corresponding to the data code, which is read out by the output control unit 7 from the page code buffer 6, that is, the number of lines corresponding to the data code not transmitted yet (hereinafter called untransmitted data codes) of the data codes corresponding to the image data read out by the reading unit 2, is monitored by an input/output monitor unit 14. This input/output monitor unit 14 applies the information corresponding to the number of lines of the untransmitted data codes to the main control unit 4.

The main control unit 4 exchanges information with the output control unit 7, and calculates the quantity of the fill codes to be added to the data codes of one line, and controls the fill insertion unit 8 according to the result of this calculation. In consequence, in the fill insertion unit 8, the fill codes corresponding to the calculated quantity are added to the data codes. The main control unit 4 exchanges the data with the transmission control unit 9 through line 15, thereby controlling the transmission processing in the transmission control unit 9.

In this embodiment, in the input/output monitor unit 14, when the number of lines between the line corresponding to the data codes written into the page code buffer 6 from the input control unit 5, and the line corresponding to the data code which is read out by the output control unit 7 from the page code buffer 6, that is, the number of lines of the untransmitted data codes is detected to be 10 lines or less, fill codes are inserted so that the required transmission time of one line may be more than the minimum tranmission time $\Delta 2$ (for example, 1 sec). Thus, it is prevented from the matter that, because of the transmission processing of the data codes transmitted from the transmission control unit 9 being done at higher speed than the reading processing of the image by the reading unit 2, the data codes are used up in the page code buffer 6 and no code is transmitted from the transmission control unit 9 for more than 5 seconds and thereby the receiving side facsimile apparatus is cut off from the telephone line.

Figure 2:
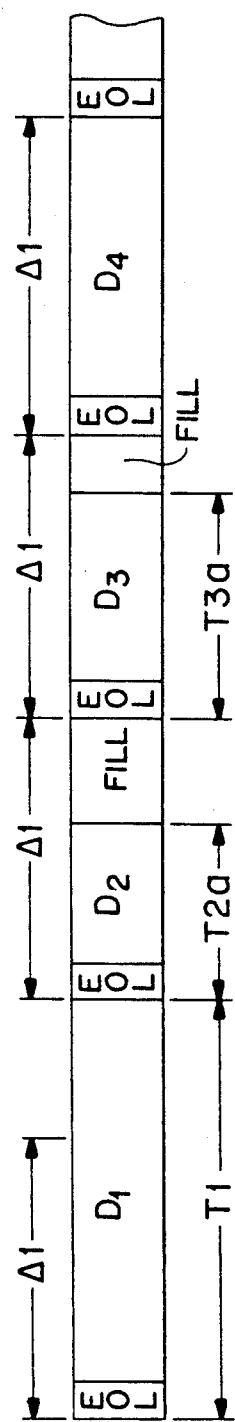
FIG. 2 and FIG. 3 are diagrams showing the composition of transmission code to be transmitted from the facsimile apparatus 1.

FIG. 2 is a diagram for explaining the composition of transmission code of the facsimile apparatus 1 when the number of lines of untransmitted data codes is more than 10 lines in the page code buffer 6. Prior to transmission of data codes $D_1$ of the first line, an end-of-line (EOL) code is transmitted, and then the data codes $D_1$ is transmitted. The transmission codes of the first line is composed of this EOL code and data codes $D_1$, and the required transmission time T1 is longer than the minimum transmission time $\Delta 1$. Therefore, fill code is not contained in the transmission codes of the first line.

When the transmission of the first line transmission codes is over, the EOL code is transmitted again, which is followed by the transmission of second line data codes $D_2$. The time T2a, required for transmission of EOL code sent prior to the data codes $D_2$ and for transmission of data codes $D_2$, is shorter than the minimum transmission time $\Delta 1$, and therefore fill codes are inserted in the transmission codes of the second line. Thus, the transmission time of the second line is designed to be longer than the minimum transmission time $\Delta 1$. That is, after the transmission of data codes $D_2$, fill codes corresponding to the time of $(\Delta 1 - T2a)$ is transmitted.

Similarly, next to the EOL code, the data codes $D_3$ of the third line is transmitted, and fill codes are also transmitted. That is, the time required for transmission T3a for third line data codes $D_3$ and EOL code is shorter than the minimum transmission time $\Delta 1$, and therefore fill codes are added. Likewise, thereafter, while the fill codes are being added, the image data is transmitted to the facsimile apparatus at the destination as transmission codes.

Figure 3:
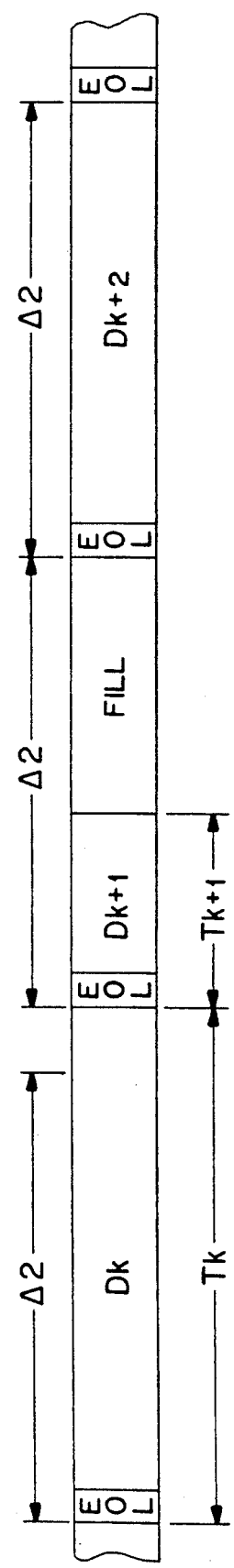

FIG. 3 shows the composition of the transmission code transmitted by the facsimile apparatus 1 when the number of lines of the untransmitted data codes in the page code buffer 6 is less than 10 lines. For example, when the required transmission time Tk of the k-th (k being a natural number) line data codes $D_k$ and EOL code exceed the minimum transmission time $\Delta 2$, fill code is not inserted.

After transmission of this data codes $D_k$, an EOL code is transmitted prior to transmission of data codes $D_{k+1}$. The required transmission time $T_{k+1}$ for the EOL code and the (k+1)-th line data codes $D_{k+1}$ is, for example, shorter than the minimum transmission time $\Delta 2$, and in such a case in succession to the transmission of data codes $D_{k+1}$, fill codes are inserted so that the required transmission time of the (k+1)-th line transmission codes may be longer than the minimum transmission time $\Delta 2$. Thereafter, a similar transmission action is effected until a difference of more than 10 lines is detected between the line corresponding to the data codes written into the page code buffer 6 and the line corresponding to the data codes being read out.

When the writing of the data codes to the page code buffer 6 is stopped, that is, when the manual scanning of the original by the reading unit 2 is stopped, the data codes stored in the page code buffer 6 decreases as the reading by the output control unit 7 advances. When such state continues until the data stored in the page code buffer 6 is sent out completely, no signal is transmitted from the facsimile apparatus 1. The state, that no signal is transmitted, continues for more than 5 seconds, the facsimile apparatus at the destination is cut off the telephone line.

FIG. 4 is a flowchart for explaining the operation of the facsimile apparatus 1 after start of reading processing by the reading unit 2 and before start of transmission of transmission codes. That is, in this embodiment, before the facsimile apparatus 1 starts its transmission processing, the data codes of more than 10 lines must be accumulated in the page code buffer 6, and therefore transmission processing is not started immediately after the reading processing by the reading unit 2.

At step n1, reading of the original image by the reading unit 2 is started, and the read image data is given to the coding unit 24 through the line buffer 3. At step n2, the image data given to the coding unit 24 is converted into MH run length codes (data codes).

At step n3, the input control unit 5 writes data codes into the page code buffer 6. At step n4, it is judged whether the data codes of more than 10 lines are accumulated in the page code buffer 6, and if not accumulated, the operation returns to step n1.

At step n4, when it is judged that the data codes of more than 10 lines are accumulated in the page code buffer 6, the operation advances to step n5, when reading/transmission parallel process is started, that is, reading processing by reading unit 2, and transmission processing by output control unit 7, fill insertion unit 8 and transmission control unit 9 are carried out simultaneously.

FIG. 5 is a flowchart for explaining the reading/transmission parallel processing in the facsimile apparatus 1. At step m1, the input/output monitor unit 14 takes in the address of which data code is presently written into the page code buffer 6 from the input control units 5, in synchronism with writing the data code into the page code buffer 6. In this time, at step m2, the input/output monitor unit 14 takes in the address, of which data code is to be read out of the page code buffer 6 next by the output control unit 7. In this way, the input/output monitor unit 14 calculates the number of lines of the untransmitted data codes stored in the page code buffer 6, and gives the information corresponding to the number of lines of untransmitted data codes to the main control unit 4.

At step m3, the main control unit 4 judges whether the lines of the untransmitted data codes are less than 10 lines or not. If judged more than 10 lines at step m3, the operation advances to step m4.

At step m4, the output control unit 7 reads out the data codes of one line from the page code buffer 6. The information relating to the quantity of data codes being read out is given to the main control unit 4. At step m5, in the main control unit 4, it is judged whether the required transmission time of the data codes read out by the output control unit 7 is more than the minimum transmission time $\Delta 1$ or not.

If judged negatively at step m5, the operation advances to step m6, and fill codes are added to the data code in the fill insertion unit 8, and the composite codes are given to the transmission control unit 9. In this way, at step m11, the transmission code containing the fill codes is transmitted from the transmission control unit 9 to the facsimile apparatus of the destination through the telephone line.

If judged affirmatively at step m5, fill codes are not added to the data codes read out by the output control unit 7, and the operation advances to step m11, and the transmission codes containing the EOL code is transmitted.

At step m3, if the untransmitted data codes are judged to be less than 10 lines, the operation advances to step m7. At step m7, it is judged whether the untransmitted data codes are present or not. If absent, the operation goes to step m12, and if present, it advances to step m8.

At step m8, the output control unit 7 reads the data codes of one line from the page code buffer 6. At this time, the output control unit 7 gives the information relating to the quantity of the data codes to the main control unit 4.

At step m9, in the main control unit 4, from the information relating to the quantity of the data codes being given, it is judged whether the required transmission time of the data codes is the minimum transmission time $\Delta 2$ or more. If judged to be less than the minimum transmission time $\Delta 2$, the operation goes to step m10, and fill codes in a quantity necessary for extending the required transmission time more than the minimum transmission time $\Delta 2$ is added in the fill insertion unit 8, and the subsequent process goes to step m11.

At step m9, if the required transmission time is judged to be the minimum transmission time $\Delta 2$ or more, the operation advances to step m11.

At step m7, when it is judged that there is no untransmitted data code and the operation advances to step m12, it is judged whether the read end signal is delivered from the reading unit 2 or not. If the reading end signal has been delivered, the operation goes to step m13, and the post message signal to tell the end of transmission of image data of one page is transmitted from the transmission control unit 9. At step m12, when reading end signal is not delivered from the reading unit 2, the operation returns to step m1.

By such operation of the facsimile apparatus 1, when the minimum transmission time $\Delta 2$ is selected at 1 sec, after stopping of manual scanning of the original surface by the reading unit 2, the facsimile apparatus at the destination is connected to the telephone line for at least 15 seconds. That is, when the data codes are fed into the page code buffer 6 from the reading unit 2 by way of the line buffer 3, coding unit 24, and input control unit 5, the data codes for at least 10 lines are accumulated inside the page code buffer 6. For transmission of the data codes of 10 lines, it takes more than 10 seconds by the processing shown in FIG. 5. Afterwards, upon lapse of 5 seconds after data codes are no longer led out from the transmission control unit 9, the facsimile apparatus at the destination is separated from the telephone line.

Thus, when manually scanning the original by the reading unit 2, whether the scanning speed is low or manual scanning is temporarily stopped, it is possible to continue to transmit the data codes, and therefore the image data can be transmitted, so to speak, in real time. It is hence not necessary to have memory possessing a large memory capacity for storing the data codes corresponding to all image data of the original image.

In this embodiment, meanwhile, the required transmission time of one line is set as the minimum transmission time when the quantity of untransmitted data codes in the page code buffer 6 is less than 10 lines, but it is not always necessary to select the standard of the quantity of the untransmitted data codes in 10 lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image data transmission apparatus, in which a unit quantity of image data is encoded in variable length and transmitted into a transmission line, the apparatus comprising:
   a transmission apparatus main body, and
   a manually movable image reading unit detachably mounted on the transmission apparatus main body the image reading unit being movable over the data to be read;
   the transmission apparatus main body including a memory for storing image data read by the image reading unit in unit quantities, and
   means for transmitting the image data in unit quantities at a first minimum time, and when quantities of image encoded data to be transmitted which is stored in the memory is less than a predetermined quantity, because of slow movement of the image unit, false data is added to the encoded unit quantity so that the transmission time of the unity quantity is a second minimum time exceeding the first minimum time so that transmission can be continued without disruption.

2. An image data transmission apparatus according to claim 1, wherein the manually movable image reading unit comprises:
   optical reading means for reading image data,
   a rotary roller rotatably contacting the surface of an original from which the image data is to be read, and
   angular disposition detecting means outputting a signal at predetermined angular dispositions of the rotary roller, and for detecting a relative moving state between the image reading unit and the original; and
   the transmission apparatus main body further comprises:

control means for storing the image data from the optical reading means into the memory in synchronism with the output of the angular disposition directing means, and sending out the stored image data of this memory to the transmitting means.

3. An image data transmission apparatus claimed in claim 2, wherein the optical reading means includes a one-dimensional contact type image sensor, and the image data of the unit quantity is image data on one scanning line as the original which is read out by the one-dimensional contact type image sensor.

4. An image data transmission apparatus comprising:
a main body of the transmission apparatus;
a manually movable image reading unit including means for detachably mounting said manually movable image reading unit to said main body of the transmission apparatus; the main body of the transmission apparatus including;
memory means for storing image data read by the said manually movable image reading unit in data units;
means for transmitting said data units at a first speed, and when the data units to be transmitted are less than a predetermined number, means for transmitting the data units at a second speed which is less than said first speed so that continuous transmission can be achieved.

5. A method of transmitting image data with the use of an image reading unit detachably mounted to an image data transmission apparatus comprised the steps of:
 (a) reading data with the manually movable image reading unit;
 (b) storing the data read;
 (c) transmitting the stored image data in units; and
 (d) adding false data elements to the transmitted units when transmitted units are less than a predetermined number so that a transmission time of units is a second minimum time exceeding a first minimum time so that a continuous transmission image data is achieved.

6. A method of continuously transmitting image data with the use of a manually movable image reading unit comprising the steps of:
 (a) reading data by the sue of movable image reading unit, the image reader being moved over the data at different speeds;
 (b) storing the read data in data units in a memory;
 (c) transmitting data units from the memory at a first speed; and
 (d) decreasing the speed of transmitting the data units to a second speed when the quantity stored data units reaches a predetermined quantity so that continuous transmission of data proceeds.

* * * * *